United States Patent
Lau et al.

(10) Patent No.: US 10,252,242 B2
(45) Date of Patent: Apr. 9, 2019

(54) ALKALI-PROMOTED ACTIVATED ALUMINA ADSORBENT

(71) Applicant: Air Products and Chemicals, Inc., Allentown, PA (US)

(72) Inventors: Garret Chi-Ho Lau, New Tripoli, PA (US); Erin Marie Sorensen, Allentown, PA (US); Fred William Taylor, Coplay, PA (US); Timothy Christopher Golden, Nantes (FR); Robert Quinn, Macungie, PA (US); William Jack Casteel, Jr., Fountain Hill, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 62 days.

(21) Appl. No.: 15/461,625

(22) Filed: Mar. 17, 2017

(65) Prior Publication Data
US 2018/0264432 A1    Sep. 20, 2018

(51) Int. Cl.
| | |
|---|---|
| *B01J 20/04* | (2006.01) |
| *B01J 20/08* | (2006.01) |
| *B01J 20/30* | (2006.01) |
| *B01D 53/04* | (2006.01) |
| *B01D 53/62* | (2006.01) |
| *B01D 53/81* | (2006.01) |
| *B01J 20/28* | (2006.01) |
| *B01D 53/047* | (2006.01) |

(52) U.S. Cl.
CPC .......... *B01J 20/043* (2013.01); *B01D 53/047* (2013.01); *B01J 20/08* (2013.01); *B01J 20/28016* (2013.01); *B01J 20/28061* (2013.01); *B01J 20/3071* (2013.01); *B01D 2253/102* (2013.01); *B01D 2253/104* (2013.01); *B01D 2253/112* (2013.01); *B01D 2257/504* (2013.01)

(58) Field of Classification Search
None
See application file for complete search history.

(56) References Cited

U.S. PATENT DOCUMENTS

| | | |
|---|---|---|
| 3,226,191 A | 12/1965 | Osment |
| 3,557,025 A | 1/1971 | Emerson et al. |
| 3,865,925 A | 2/1975 | Gidaspow et al. |
| 4,249,915 A | 2/1981 | Sircar et al. |
| 4,433,981 A | 2/1984 | Slaugh et al. |
| 4,477,264 A | 10/1984 | Kratz et al. |
| 4,493,715 A | 1/1985 | Hogan et al. |

(Continued)

FOREIGN PATENT DOCUMENTS

EP    1749571    2/2007

OTHER PUBLICATIONS

Auta, M., "Fixed-bed column adsorption of carbon dioxide by sodium hydroxide modified activated alumina", Chemical Engineering Journal, 2013, pp. 80-87.

(Continued)

*Primary Examiner* — Daniel Berns
(74) *Attorney, Agent, or Firm* — Bryan C. Hoke, Jr.

(57) ABSTRACT

An adsorbent for removing $CO_2$ from a gas mixture, the adsorbent comprising alumina and a carbonate compound where the carbonate to alumina IR absorbance intensity ratio is reduced by washing the adsorbent with water. The disclosure also describes a method of making adsorbent particles, process for removing $CO_2$ from a gas mixture using the adsorbent, and an adsorption unit using the adsorbent.

8 Claims, 2 Drawing Sheets

(56) References Cited

U.S. PATENT DOCUMENTS

| | | | |
|---|---|---|---|
| 4,512,780 | A | 4/1985 | Fuderer |
| 4,568,664 | A | 2/1986 | Goodboy |
| 4,755,499 | A | 7/1988 | Neal |
| 5,203,888 | A | 4/1993 | Maurer |
| 5,232,474 | A | 8/1993 | Jain |
| 5,656,064 | A | 8/1997 | Golden et al. |
| 5,843,862 | A * | 12/1998 | Bhattacharyya ......... B01J 20/06 502/411 |
| 5,919,286 | A | 7/1999 | Golden et al. |
| 5,935,894 | A | 8/1999 | Kanazirev |
| 6,125,655 | A | 10/2000 | Millet et al. |
| 6,454,838 | B1 | 9/2002 | Xu et al. |
| 6,719,842 | B2 | 4/2004 | Hayashida et al. |
| 7,759,228 | B2 | 7/2010 | Sugiyama et al. |

OTHER PUBLICATIONS

Lee, Soo Chool, "Dry Potassium-Based Sorbents for CO2 Capture", Catal. Surv Asia, 2007, pp. 171-185.

Lee, K. B., "Chemisorption of Carbon Dioxide on Sodium Oxide Promoted Alumina", AIChE Journal, 2007, pp. 2824-2831.

Ruckenstein, E., "Sorption of solids with bidisperse pore structures", Chemical Engineering Science, 1971, pp. 1305-1318.

Sharonov, V.E., "Sorption of CO2 from Humid Gases on Potassium Carbonate Supported by Porous Matrix", Russian Journal of Applied Chemistry, 2001, pp. 409-413.

Sharonov, Vasily E., "Kinetics of Carbon Dioxide Sorption by the Composite Material K2CO3IN Al2O3", React. Kinet. Catal. Lett, 2004, pp. 363-369.

Veselovskaya, Janna V., "Direct CO2 capture from ambient air using K2CO3/Al2O3 composite sorbent", International Journal of Greenhouse Gas Control, 2013, pp. 332-340.

Vijayalakshmi, R. P., "Modification of texture and surface basicity of y-alumina by chemical treatment", Applied Aspects of Industrial Catalysis, 1998, pp. 613-622.

Zhao, Chuanwen, "K2CO3/Al2O3 for Capturing CO2 in Flue Gas from Power Plants. Part 3: CO2 Capture Behaviors of K2CO3/Al2O3 in a Bubbling Fluidized-Bed Reactor", Energy Fuels, 2012, pp. 3062-3068.

* cited by examiner

ALKALI-PROMOTED ACTIVATED ALUMINA ADSORBENT

BACKGROUND

Before air can be introduced into a cryogenic air separation process in which oxygen and nitrogen are separated from one another, it is necessary to remove carbon dioxide present in the air at low levels, e.g. 400 ppm. If this is not done, the carbon dioxide will solidify in the air separation plant. Two methods generally used for such carbon dioxide removal are pressure swing adsorption (PSA) and temperature swing adsorption (TSA).

In each of these techniques, a bed of adsorbent is exposed to a flow of feed air for a period of time to adsorb $CO_2$ from the air. Thereafter, the flow of feed air is shut off from the adsorbent bed and the adsorbent is exposed to a flow of purge gas which strips the adsorbed $CO_2$ from the adsorbent and regenerates the adsorbent for further use. In TSA, the $CO_2$ is driven off from the adsorbent by heating the adsorbent in the regeneration phase. In PSA, the pressure of the purge gas is lower than that of the feed gas and the change in pressure is used to remove the $CO_2$ from the adsorbent.

Other components can be removed from the feed air by these processes, including hydrocarbons and water. These adsorption techniques can also be applied to feed gases other than air or to air to be purified for purposes other than use in an air separation plant. For example, other applications where trace or dilute $CO_2$ needs to be removed prior to a cryogenic separation include the cryogenic production of CO from synthesis gas, the production of liquefied natural gas, and production of dry $CO_2$-free air for a variety of applications.

The use of PSA for removing $CO_2$ from air prior to cryogenic air separation is described in numerous publications, e.g. U.S. Pat. No. 4,249,915 and U.S. Pat. No. 4,477,264. Initially, the practice was to use a dual bed of alumina for water removal followed by a zeolite such as 13× for $CO_2$ removal. More recently, all alumina PSA systems have been proposed, as described in U.S. Pat. No. 5,232,474. The advantages of an all alumina system include lower adsorbent cost, vessel design which does not need screens to separate the two different adsorbents, and better thermal stability in the adsorption vessel during blowdown and repressurization. It would be desirable however, to develop adsorbents having an improved $CO_2$ capacity so as to allow smaller bed sizes with lower capital costs and less void gas being lost during depressurization i.e. higher air recoveries.

Alumina is also used as an adsorbent in TSA and for this purpose it has been proposed to treat the alumina to form alkali metal oxides thereon to increase the adsorptive capacity of the alumina. By way of example, U.S. Pat. No. 4,493,715 teaches a method for removing $CO_2$ from olefin streams by contacting the feed gas with a regenerable, calcined adsorbent consisting essentially from 1 to 6 wt % of an alkali metal oxide selected from the group consisting of sodium, potassium, and lithium on alumina. The adsorbent was prepared by contacting alumina with an alkali metal compound which is convertible to the metal oxide on calcination.

U.S. Pat. No. 4,433,981 describes a process for removing $CO_2$ from a gaseous stream which comprises contacting the gas steam at a temperature up to about 300° C. with an adsorbent prepared by impregnation of a porous alumina with a sodium or potassium oxide. The corresponding oxide can be prepared by impregnation with a decomposable salt and calcining at a temperature of 350° C. to 850° C. Salts mentioned include alkali metal bicarbonates.

U.S. Pat. No. 3,557,025 teaches a method to produce alkalized alumina capable of adsorbing $SO_2$ by selectively calcining the alumina, and contacting with an alkali or ammonium bicarbonate salt to form at least 30% by weight alkalized alumina having the empirical formula $MAl(OH)_2CO_3$.

U.S. Pat. No. 3,865,924 describes the use of a finely ground mixture of potassium carbonate and alumina as an absorbent for carbon dioxide, which reacts with the carbonate and water to form bicarbonate. The absorbent mixture is regenerated by mild heating, e.g. at 93° C. (200° F.). The presence of stoichiometric quantities of water is essential and the alumina appears to be regarded as essentially a mere carrier for the potassium carbonate. Other carbonates may be used.

U.S. Pat. No. 5,232,474 discloses a PSA process using alumina in 70-100% of the bed volume to remove water and carbon dioxide from air. Preference is expressed for alumina containing up to 10 wt. % silica as opposed to the generality of aluminas which typically contain only about 1% silica.

U.S. Pat. No. 5,656,064 discloses treatment of alumina with a base without calcining to form an alkali metal oxide to increase substantially the $CO_2$ adsorption capacity of the alumina that is capable of regeneration under PSA conditions.

U.S. Pat. No. 6,125,655 discloses a TSA process for purifying an air flow containing carbon dioxide and water vapor, in which at least some of the $CO_2$ and water vapor impurities are removed by adsorbing the impurities on at least one calcined alumina containing at most 10% by weight (preferably 4 to 8 wt. %) of at least one alkali or alkaline-earth metal oxide, the adsorption being carried out at a temperature of between −10° C. and 80° C. For PSA cycles, no more than 5 wt. % alkali or alkaline earth metal promotions was preferred.

U.S. Pat. No. 7,759,288 discloses base treated aluminas that exhibit improved $CO_2$ capacity compared to untreated aluminas. The base treated aluminas prepared by physically mixing alumina and base during forming reportedly have (1) a higher surface area, (2) less hydrothermal aging, (3) improved $CO_2$ capacity, and (4) lower cost than base treated aluminas produced by aqueous impregnation.

U.S. Pat. No. 5,656,064 and U.S. Pat. No. 6,125,655 teach that a physical incorporation (incipient wetness impregnation on formed beads or co-formed during bead rolling) of alkali carbonates or oxides on activated alumina enhances $CO_2$ capacity, and is optimized by alkali type, weight loading, and/or surface pH. The method of alkali incorporation can provide differences as well, as U.S. Pat. No. 7,759,288 teaches an improvement in capacity, surface area, and aging stability by co-forming instead of impregnation. The problem with these compositions, in PSA operation, is the loss in capacity between the first and second cycle of $CO_2$ exposure and regeneration purge. As U.S. Pat. No. 5,656,064 shows, $CO_2$ Henry's constants show at best 28% of their original $CO_2$ capacity after just one regeneration under vacuum at ambient temperature.

Activated alumina adsorbents, promoted with alkali (e.g. Na, and K) compounds, are known for removing $CO_2$ from gas mixtures such as air. Alkali compounds increase the basicity of the alumina surface, which increases its affinity for $CO_2$ sorption. It is well-known in the art that $CO_2$ will react with the alkali oxides to form alkali carbonates, and further reaction of $CO_2$ can occur in the presence of water vapor to form alkali bicarbonate.

Industry desires improved adsorbents for removing $CO_2$ from gas mixtures containing low concentrations of $CO_2$.

Industry desires improved adsorbents for capturing $CO_2$ from ambient air.

Industry desires an improved process to produce adsorbents for removing $CO_2$ from gas mixtures.

Industry desires an improved device to produce dry, $CO_2$-free air.

Industry desires an improved device to produce dry, $CO_2$-free synthesis gas.

Industry desires an improved device to produce dry, $CO_2$-free natural gas.

BRIEF SUMMARY

The present disclosure relates to an alkali-promoted activated alumina adsorbent for removing $CO_2$ from a gas mixture containing $CO_2$, a method of making the adsorbent, and a process using the adsorbent.

There are several aspects of the disclosure as outlined below. In the following, specific aspects are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An adsorbent for use in a process to remove $CO_2$ from a gas mixture containing $CO_2$, the adsorbent comprising:
alumina;
a carbonate compound; and
one or more alkali metals wherein the adsorbent is 0.5 weight % to 10 weight % or 1 to 10 weight % of the one or more alkali metals;
wherein the surface area of the adsorbent ranges from 220 $m^2/g$ to 400 $m^2/g$; and
wherein the adsorbent has a carbonate to alumina intensity ratio, R, the carbonate to alumina intensity ratio, R, having a value less than or equal to 0.0150, where the carbonate to alumina intensity ratio is as determined by Fourier Transform infrared (FTIR) spectroscopy of a crushed sample of the adsorbent, wherein the carbonate to alumina intensity ratio is a ratio of a peak absorbance intensity for carbonate, $AI_{carbonate}$, to a peak absorbance intensity for alumina, $AI_{alumina}$, (i.e. $R=AI_{carbonate}/AI_{alumina}$), each peak absorbance intensity obtained after subtracting a baseline signal intensity, where the peak absorbance intensity for alumina, $AI_{alumina}$, is observed at an FTIR wavenumber in a range from 420 $cm^{-1}$ to 520 $cm^{-1}$, and the peak absorbance intensity for carbonate, $AI_{carbonate}$, is observed at an FTIR wavenumber in a range from 1300 $cm^{-1}$ to 1400 $cm^{-1}$.

Aspect 2. The adsorbent according to aspect 1 wherein the adsorbent is 90 to 99 weight % alumina.

Aspect 3. The adsorbent according to aspect 1 or aspect 2 wherein the carbonate compound is an alkali carbonate.

Aspect 4. The adsorbent according to aspect 3 wherein the alkali carbonate is $K_2CO_3$.

Aspect 5. The adsorbent according to any one of aspects 1 to 4 wherein the value of the carbonate to alumina intensity ratio ranges from 0.003 to 0.0150 or ranges from 0.0035 to 0.013.

Aspect 6. A method for making adsorbent particles for adsorbing $CO_2$, the adsorbent particles comprising alumina, one or more alkali metals, and a carbonate compound, the method comprising:
washing alkali-promoted activated alumina materials comprising a carbonate compound with water; and
drying the washed alumina materials to form the adsorbent particles;
wherein the washed and dried adsorbent particles have a carbonate to alumina intensity ratio, $R_2$, which is smaller than the carbonate to alumina intensity ratio, $R_1$, of the alkali-promoted activated alumina materials before washing;
wherein the carbonate to alumina intensity ratio is as determined by Fourier Transform infrared (FTIR) spectroscopy of a crushed sample of the respective washed and dried adsorbent particles and a crushed sample of the alkali-promoted activated alumina materials before washing, wherein the carbonate to alumina intensity ratio is a ratio of a peak absorbance intensity for carbonate, $AI_{carbonate}$, to a peak absorbance intensity for alumina, $AI_{alumina}$, (i.e. $R=AI_{carbonate}/AI_{alumina}$), each peak absorbance intensity obtained after subtracting a baseline signal intensity, where the peak absorbance intensity for alumina, $AI_{alumina}$, is observed at an FTIR wavenumber in a range from 420 $cm^{-1}$ to 520 $cm^{-1}$, and the peak absorbance intensity for carbonate, $AI_{carbonate}$, is observed at an FTIR wavenumber in a range from 1300 $cm^{-1}$ to 1400 $cm^{-1}$.

Aspect 7. The method according to aspect 6 wherein the alkali-promoted activated alumina materials are washed sufficiently to produce adsorbent particles having a carbonate to alumina intensity ratio, $R_2$, having a value less than or equal to 0.0150.

Aspect 8. The method according to claim 6 wherein the alkali-promoted activated alumina materials are washed with water until the alkali-promoted activated alumina materials have a pH in solution of 9.5 or less than 9.5 or less than 9 thereby forming washed alumina materials, the pH in solution as determined by measuring the pH of an equilibrated 2 liter solution of deionized water containing 100 g of the washed alumina materials.

Aspect 9. A method for making adsorbent particles for adsorbing $CO_2$, the adsorbent particles comprising alumina, one or more alkali metals, and a carbonate compound, the method comprising:
washing alkali-promoted activated alumina materials comprising a carbonate compound with water; and
drying the washed alumina materials to form the adsorbent particles;
wherein the alkali-promoted activated alumina materials are washed sufficiently to produce adsorbent particles having a carbonate to alumina intensity ratio, R, the carbonate to alumina intensity ratio, R, having a value less than or equal to 0.0150, where the carbonate to alumina intensity ratio is as determined by Fourier Transform infrared (FTIR) spectroscopy of a crushed sample of the adsorbent particles, wherein the carbonate to alumina intensity ratio is a ratio of a peak absorbance intensity for carbonate, $AI_{carbonate}$, to a peak absorbance intensity for alumina, $AI_{alumina}$, (i.e. $R=AI_{carbonate}/AI_{alumina}$), each peak absorbance intensity obtained after subtracting a baseline signal intensity, where the peak absorbance intensity for alumina, $AI_{alumina}$, is observed at an FTIR wavenumber in a range from 420 $cm^{-1}$, and the peak absorbance intensity for carbonate, $AI_{carbonate}$, is observed at an FTIR wavenumber in a range from 1300 $cm^{-1}$ to 1400 $cm^{-1}$.

Aspect 10. A method for making adsorbent particles for adsorbing $CO_2$, the adsorbent particles comprising alumina, one or more alkali metals, and a carbonate compound, the method comprising:

washing alkali-promoted activated alumina materials comprising a carbonate compound with water until the alkali-promoted activated alumina materials have a pH in solution of 9.5 or less than 9.5 or less than 9 thereby forming washed alumina materials, where the pH in solution is as determined by measuring the pH of an equilibrated 2 liter solution of deionized water containing 100 g of the washed alumina materials; and drying the washed alumina materials to form the adsorbent particles.

Aspect 11. The method according to any one of aspects 6 to 10 wherein the alkali-promoted activated alumina materials have a surface area ranging from 220 $m^2/g$ to 400 $m^2/g$.

Aspect 12. The method according to any one of aspects 6 to 11 wherein the alkali-promoted activated alumina materials are washed with water containing less than 100 ppm total dissolved solids.

Aspect 13. The method according to any one of aspects 6 to 12 wherein the alkali-promoted activated alumina materials are washed with deionized water.

Aspect 14. The method according to any one of aspects 6 to 13 wherein the washed alumina materials are dried in air, a vacuum, or an atmosphere containing greater than 79 mole % $N_2$.

Aspect 15. The method according to any one of aspects 6 to 14 wherein the washed alumina materials are dried in an oven at a temperature ranging from 25° C. to 100° C.

Aspect 16. Adsorbent particles for use in a process to remove $CO_2$ from a gas mixture containing $CO_2$ made in a method according to any one of aspects 6 to 15.

Aspect 17. A process for removing $CO_2$ from a gas mixture containing $CO_2$, the process comprising:

passing the gas mixture containing $CO_2$ into a bed containing the adsorbent according to any one of aspects 1 to 5 or a bed containing the adsorbent particles according to aspect 16; and withdrawing a $CO_2$-depleted gas from the bed.

Aspect 18. The process according to aspect 17 wherein the process is a pressure swing adsorption process.

Aspect 19. The process according to aspect 17 wherein the process is a temperature swing adsorption process.

Aspect 20. The process according to any one of aspects 17 to 19 wherein the gas mixture containing $CO_2$ has a concentration of $CO_2$ that is 1 mole % $CO_2$ or less than 1 mole % $CO_2$.

Aspect 21. The process according to any one of aspects 17 to 20 wherein the gas mixture containing $CO_2$ has a concentration of $CO_2$ that is 5 ppmv or greater.

Aspect 22. The process according to any one of aspects 17 to 21 wherein the gas mixture contains $O_2$, $N_2$, and $H_2O$.

Aspect 23. The process according to any one of aspects 17 to 21 wherein the gas mixture contains CO, $H_2$, and $H_2O$.

Aspect 24. The process according to any one of aspects 17 to 21 wherein the gas mixture contains $CH_4$, and $H_2O$.

Aspect 25. The process according to any one of aspects 17 to 22 wherein the gas mixture is a feed to a cryogenic air separation unit.

Aspect 26. An adsorption unit comprising a bed containing the adsorbent according to any one of aspects 1 to 5 or the particles according to aspect 16.

DETAILED DESCRIPTION OF THE PREFERRED EMBODIMENTS

Figure 1:
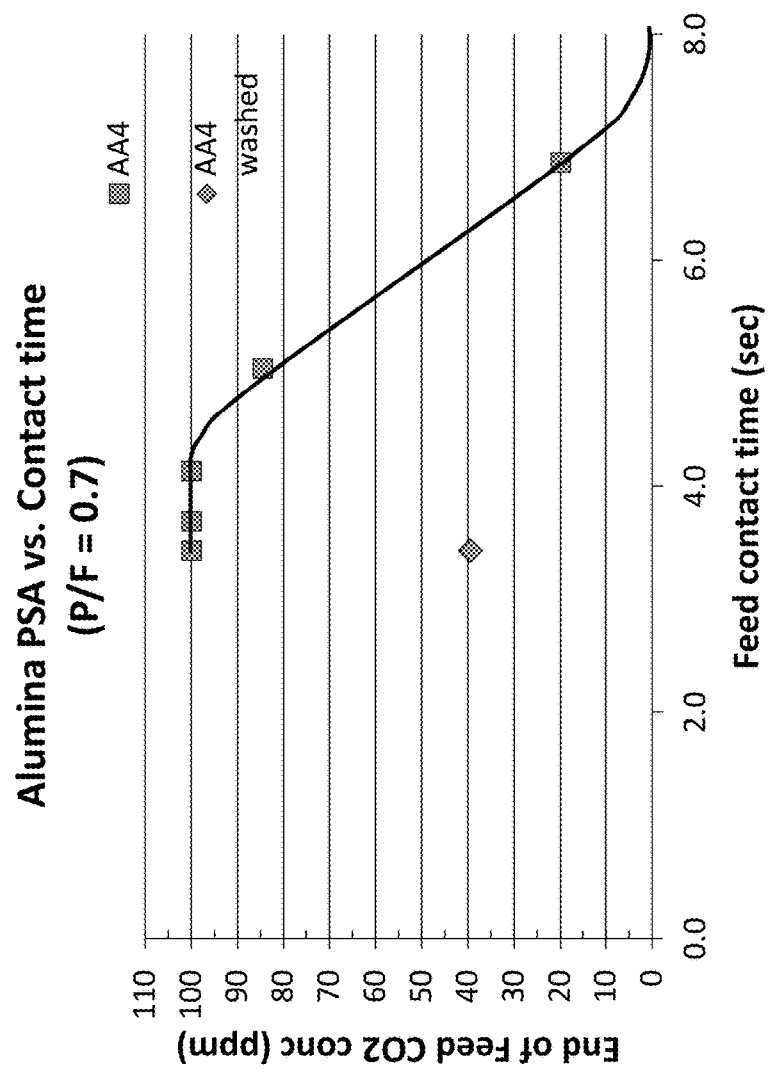
FIG. 1 is a plot of end of feed $CO_2$ concentration versus feed contact time for as-received (unwashed) and washed adsorbent AA4.

The ensuing detailed description provides preferred exemplary embodiments only, and is not intended to limit the scope, applicability, or configuration of the disclosure. Rather, the ensuing detailed description of the preferred exemplary embodiments will provide those skilled in the art with an enabling description for implementing the preferred exemplary embodiments, it being understood that various changes may be made in the function and arrangement of elements without departing from the scope as defined by the claims.

The articles "a" and "an" as used herein mean one or more when applied to any feature in embodiments described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

The present disclosure relates to an adsorbent comprising alumina, one or more alkali metals, and a carbonate compound for use in a process to remove $CO_2$ from a gas mixture containing $CO_2$, a process and adsorption unit for removing $CO_2$ from a gas mixture containing $CO_2$ using adsorbent particles, and a method for making the adsorbent particles.

The adsorbent may be in any known particle form, for example, pellets, beads, powder, monoliths, laminates, or any other form known in the art.

The gas mixture may contain oxygen and nitrogen and may be a feed to a cryogenic air separation unit. The gas mixture may have a concentration of $CO_2$ that is 1 mole % or less than 1 mole %. The gas mixture may have a concentration of $CO_2$ that is greater than 5 ppmv $CO_2$. The gas mixture may also contain water and the adsorbent may also remove water from the gas mixture. The adsorbent may demonstrate simultaneous water and $CO_2$ removal.

The adsorbent according to the present disclosure comprises alumina, a carbonate compound, and one or more alkali metals. The adsorbent may contain 0.5 weight % to 10 weight % or 1 weight % to 10 weight % of the one or more alkali metals. The weight % of the one or more alkali metals is the weight % of the respective weight of the alkali metal, not the weight % of the alkali compound. The one or more alkali metals are present in ionic form. The adsorbent may be 90 to 99 weight % alumina. The carbonate compound may be an alkali carbonate, for example, $K_2CO_3$. The weight % alkali metal may be determined by X-ray fluorescence (XRF) spectroscopy.

The alumina and carbonate compound may be co-formed or spray-formed to form the adsorbent.

The surface area of the adsorbent ranges from 220 $m^2/g$ to 400 $m^2/g$. Adsorbents with surface areas in this range are suitable for air pre-purification. Alumina adsorbents used in air pre-purification typically have a surface area greater than 220 $m^2/g$ because this surface area is required to maintain high water capacity, and the alumina adsorbent must also be capable of removing water in addition to $CO_2$ to prevent solidification of both $CO_2$ and water in downstream cryogenic processes. Adsorbents having a surface area less than 220 $m^2/g$ are generally not suitable for removing water from the feed gas mixture for air pre-purification for a cryogenic air separation plant.

The present inventors have discovered that washing an alkali salt promoted activated alumina adsorbent with water significantly improves the performance of the adsorbent for removing $CO_2$ from air in pressure swing and temperature swing adsorption processes. The adsorbent retains some alkali after washing so that enhanced $CO_2$ capacity remains, but water soluble carbonate species that appear to hinder the adsorbent's cyclic ability to sorb and desorb $CO_2$ are removed from the adsorbent.

The adsorbent may be characterized by a carbonate to alumina intensity ratio, R, having a value less than or equal to 0.0150 as determined by Fourier Transform infrared (FTIR) spectroscopy of a crushed sample of the adsorbent. The value of the carbonate to alumina intensity ratio may range from 0.003 to 0.0150 or may range from 0.0035 to 0.013. This carbonate to alumina intensity ratio is lower than the carbonate to alumina intensity ratios found in prior art adsorbents.

The carbonate to alumina intensity ratio correlates to the ratio of the mass fraction of carbonate to alumina.

The Fourier Transform infrared (FTIR) spectroscopy may be done, for example, using a Nicolet Nexus 670 FTIR interferometer.

The crushed sample is formed by crushing a sample of the adsorbent, for example, using a mortar and pestle. The crushed sample may have a mean particle size ranging from 10 microns to 300 microns. The particle size may be determined by the method described by Eshel et al. in Soil Sci. Soc. Am. J. 68:736-743 (2004), using a Horiba LA-950 laser particle size analyzer.

As part of the measurement method, the crushed sample of adsorbent is pressed on a diamond crystal in a SmartORBIT™ Attenuated Total Reflectance accessory.

The carbonate to alumina intensity ratio is a ratio of a peak absorbance intensity for carbonate, $AI_{carbonate}$, to a peak absorbance intensity for alumina, $AI_{alumina}$, (i.e. $R=AI_{carbonate}/AI_{alumina}$), each peak absorbance intensity obtained after subtracting a baseline signal intensity. The peak absorbance intensity for alumina and the peak absorbance intensity for carbonate are observed by Fourier Transform infrared (FTIR) spectroscopy of the crushed sample of the adsorbent. The peak absorbance intensity for alumina, $AI_{alumina}$, is observed at an FTIR wavenumber in a range from 420 $cm^{-1}$ to 520 $cm^{-1}$, and the peak absorbance intensity for carbonate, $AI_{carbonate}$, is observed at an FTIR wavenumber in a range from 1300 $cm^{-1}$ to 1400 $cm^{-1}$. The peak absorbance intensity is the maximum value in the specified range.

The baseline signal intensity is a linear baseline function determined from two local minimum values of absorbance intensity between frequencies ranging from 1100 $cm^{-1}$ to 1800 $cm^{-1}$. Determining baseline signal intensities and subtracting baseline signal intensities from absorbance intensity spectra is routine and standard in the field of FTIR spectroscopy.

The peak absorbance intensity for alumina and the peak absorbance intensity for carbonate may be as determined from an FTIR spectrum as obtained by co-adding multiple scans. In the present case, it has been found beneficial to co-add 128 scans at 4 $cm^{-1}$ resolution using a Nicolet Nexus 670 FTIR interferometer.

The present disclosure also relates to methods for making adsorbent particles comprising alumina, one or more alkali metals, and a carbonate compound for adsorbing $CO_2$ having improved sorbing and desorbing characteristics.

The methods for making adsorbent particles comprise washing alkali-promoted activated alumina materials comprising a carbonate compound with water, and drying the washed alumina materials to form the adsorbent particles. The materials are preferably washed with water containing less than 100 ppm total dissolved solids, and more preferably deionized water. Total dissolved solids may be measured, for example, by the method described in American Society of Testing and Materials (ASTM) D5907-13.

Alkali-promoted activated alumina materials comprising a carbonate compound are available commercially, for example, from Axens, BASF, Porocel and/or UOP.

Alkali-promoted activated alumina materials may be formed by incorporating an alkali metal carbonate into activated alumina materials to form alkali-promoted alumina materials. The alkali-promoted alumina materials may be calcined in an atmosphere, for example an air atmosphere, to form the alkali-promoted activated alumina materials, which are subsequently cooled. Calcining temperatures typically range from about 300° C. to 350° C. Activated alumina production is well-known and described, for example, in U.S. Pat. Nos. 3,226,191, 4,568,664, and 5,935,894.

The alkali-promoted activated alumina materials may be made by incorporating alkali metal carbonate into an activated alumina structure by spray coating an alumina support structure. The alkali-promoted activated alumina materials may be made by incorporating alkali metal carbonate into an activated alumina structure by co-forming the alkali metal carbonate with alumina to form the alkali-promoted activated alumina materials. Any known process for making alkali-promoted activated alumina materials may be used.

The washing may be done in a batch or continuous process.

Washing does not remove all of the alkali—some remains either as water insoluble $K_2Al(CO_3)_2OH$ dawsonite phase, or potassium cations intercalated into gibbsite phases on the activated alumina surface. This remaining alkali enhances the surface basicity enough to increase equilibrium $CO_2$ capacity compared to unpromoted alumina, but does not hinder $CO_2$ kinetics. Pure $K_2CO_3$ can limit rates of $CO_2$ sorption by its relatively slow reaction with $CO_2$ as described by Rahimpour et al., in *Chemical Engineering and Processing* 43 (2004) pp. 857-865.

The carbonate to alumina intensity ratio of a crushed sample of the adsorbent particles as determined by FTIR spectroscopy is decreased by washing the adsorbent with water.

The alkali-promoted activated alumina materials may be washed sufficiently to produce adsorbent particles having a carbonate to alumina intensity ratio, $R_2$, which is smaller than the carbonate to alumina intensity ratio, $R_1$, of the alkali-promoted activated alumina materials before washing.

The alkali-promoted activated alumina materials may be washed sufficiently to produce adsorbent particles having a carbonate to alumina intensity ratio, R, having a value less than or equal to 0.0150 as determined by Fourier Transform infrared (FTIR) spectroscopy of a crushed sample of the adsorbent particles. The value of the carbonate to alumina intensity ratio may range from 0.003 to 0.0150 or may range from 0.0035 to 0.013 as a result of washing with water.

The description above relating to the adsorbent regarding the carbonate to alumina intensity ratio, FTIR spectroscopy, crushed sample, etc. applies also to this embodiment of the method for making adsorbent particles.

The pH of a washing solution in equilibrium with a quantity of adsorbent after washing is also decreased by washing the adsorbent with water. The method of making the adsorbent particles can therefore also be characterized by the pH of a washing solution after washing the adsorbent.

The alkali-promoted activated alumina materials may be washed with water until the alkali-promoted activated alumina materials have a pH in solution of 9.5 or less than 9.5 or less than 9 thereby forming washed alumina materials. The pH in solution is determined by measuring the pH of an equilibrated 2 liter solution of deionized water containing 100 g of the washed alumina materials. The solution may be considered equilibrated if the pH does not change after repeated measurements over the period of several hours. The pH may be measured using a digital Fisher Science Education pH/ion 510 meter. The pH meter may be calibrated with standard buffer solutions at 4.0, 7.0, and 10.0.

Alkali-promoted activated alumina materials as received from a supplier have a pH in solution of greater than 9 where the pH in solution is as determined by measuring the pH of an equilibrated 2 liter solution of deionized water containing 100 g of the as-received alkali-promoted activated alumina materials.

The washed alumina materials may be dried in an oven at a temperature ranging from 25° C. to 100° C.

The washed alumina materials may be dried in air, a vacuum, or an atmosphere containing greater than 79 mole % $N_2$ to 100 mole % $N_2$, or an atmosphere containing Ar or He. Generally, the drying atmosphere should preferably contain less than 50 ppmv $CO_2$ and contain water with a dew point ranging from −90° C. to −40° C.

The present disclosure also relates to a process for removing $CO_2$ from a gas mixture containing $CO_2$. The gas mixture may contain oxygen and nitrogen, and may be a feed to a cryogenic air separation unit. The gas mixture may have a concentration of $CO_2$ that is 1 mole % $CO_2$ or less than 1 mole % $CO_2$. The gas mixture may have a concentration of $CO_2$ that is greater than 5 ppmv. The gas mixture may also contain water and the adsorbent may also remove water from the gas mixture.

The process comprises passing the gas mixture containing $CO_2$ into a bed containing the adsorbent having the desired characteristics as described above or made by the methods described above, and withdrawing a $CO_2$-depleted gas from the bed.

The process may be a pressure swing adsorption (PSA) process. Pressure swing adsorption is well-known. PSA cycles suitable for use with the present adsorbent include U.S. Pat. Nos. 5,656,065, 5,919,286, 5,232,474, 4,512,780, 5,203,888, 6,454,838, and 5,156,657, and U.S. Pat. Appl. No. 2014/0373713.

The process may be a temperature swing adsorption (TSA) process. Temperature swing adsorption is well-known. TSA cycles suitable for use with the present adsorbent include U.S. Pat. Nos. 5,614,000, 5,855,650, 7,022,159, 5,846,295, 5,137,548, 4,541,851, 4,233,038, and 3,710,547.

The present disclosure also relates to an adsorption unit. The adsorption unit comprises a bed containing the adsorbent having the desired characteristics as described above and/or made by the methods described above.

EXAMPLES

Several samples of commercially-supplied activated alumina beads having a bead diameter of 2 mm, were washed with deionized water. The specifications for each of the samples are shown in Table 1.

Adsorbent AA1 is promoted with 5 wt % potassium carbonate. The adsorbent is a spray-formed adsorbent, and falls within the scope of the adsorbent described in U.S. Pat. No. 5,656,064. 102 grams of the adsorbent was added to 2 liters of deionized water and manually stirred for several minutes. After equilibration, the pH of this 2 liter water solution was 11. The pH was measured using a digital Fisher Science Education pH/ion 510 meter, calibrated with standard buffer solutions at 4.0, 7.0, and 10.0. The solution was decanted. This soaking/washing process was repeated 14 times, after which the beads were filtered from the washing solution with a Buchner funnel. The solution over the alumina beads on the final wash measured a pH of 9.

After filtration the beads were dried in air in an oven at 90° C.

Other adsorbents were similarly washed and dried. These adsorbents included potassium carbonate co-formed adsorbent, AA2, which falls within the scope of the adsorbent described in U.S. Pat. No. 7,759,288, sodium oxide promoted activated alumina, AA3, which falls within the scope of U.S. Pat. No. 6,125,655, and AA4, another commercially available potassium carbonate co-formed adsorbent.

TABLE 1

| Adsorbent | AA1 | AA2 | AA3 | AA4 |
|---|---|---|---|---|
| Surface area (m²/g) | 230 | 266 | 230 | 261 |

TABLE 1-continued

| Adsorbent | AA1 | AA2 | AA3 | AA4 |
|---|---|---|---|---|
| Bulk density (kg/m³) | 873 | 913 | 766 | 791 |
| Particle size distribution | 95% between 8 × 14 Tyler mesh | 95% between 8 × 14 Tyler mesh | 95% between 8 × 14 Tyler mesh | 95% between 8 × 14 Tyler mesh |
| Alkali promoter | K₂CO₃ | K₂CO₃ | Na₂O | K₂CO₃ |
| Promoter loading (wt %) | 5 | 8 | 13 | 8 |

Each of the adsorbents was tested in a pressure swing adsorption test rig. Unwashed and washed samples of the adsorbents were tested.

For each adsorbent test, a 1.9 cm (0.75 inch) diameter by 45.7 cm (18 inch) tall vessel was filled with respective adsorbent particles. The single vessel was cycled under PSA conditions with a feed gas flowing at 5 liters per minute for 10 minutes at 308 kPa absolute (30 psig) pressure, followed by depressurization to 136 kPa absolute (5 psig), and a regeneration purge gas flowing at 3.5 liters per minute for 10 minutes at 136 kPa absolute (5 psig) pressure. The feed gas was a gas mixture containing air with 400 ppm $CO_2$. The purge gas was $N_2$. The vessel containing the respective adsorbents were cycled until a steady state was achieved.

The concentration of $CO_2$ at the exit end of the vessel was measured during the feed step. The concentration of $CO_2$ at the end of the feed step was recorded and a mean value of the $CO_2$ concentration at the end of feed step calculated for 10 cycles after steady state was achieved. The mean values of the $CO_2$ concentration at the end of feed for each of the adsorbents in as-received and washed are shown in Table 2.

TABLE 2

|  | AA1 | | AA2 | |
|---|---|---|---|---|
|  | as-received | washed | as-received | washed |
| CO₂ (ppm) | 58.0 | 34.7 | 72.8 | 36.0 |

|  | AA3 | | AA4 | |
|---|---|---|---|---|
|  | as-received | washed | as-received | washed |
| CO₂ (ppm) | >100 | 16.3 | >100 | 39.5 |

It is shown that water washed versions of promoted alumina adsorbents reduce the amount of $CO_2$ present at the end of PSA feed steps in cyclic operation, demonstrating that the washed alumina is removing more $CO_2$ than the as-received promoted alumina under equivalent process conditions.

In another series of tests, adsorbent AA4 was cycled with incrementally slower feed and purge gas flow rates, and longer feed and purge step times such that the total volume of feed gas (50 liters) and total volume of purge gas (35 liters) processed was the same as the PSA test conditions described above. The resulting effect was an increase to the empty bed contact time (gas flow rate divided by empty bed volume) in both feed and regeneration steps. As shown in FIG. 1, the unwashed AA4 requires a much longer contact time to achieve the same $CO_2$ removal performance as washed AA4. The results show that washing the adsorbents improves the kinetics of $CO_2$ adsorption and desorption such that equivalent PSA performance can be achieved with 45% less contact time vs. un-washed alumina adsorbent. The improved kinetics reduces bed size and associated capital costs.

The impact of washing on the percent alkali utilization was also determined. The percent alkali utilization, or alkali utilization is defined as:

$$100*(C_{PAA}-C_{AA})/C_{CO2}$$

where $C_{PAA}$=$CO_2$ capacity of promoted activated alumina, in mmol/g;

$C_{AA}$=$CO_2$ capacity of unpromoted activated alumina, in mmol/g; and $C_{CO2}$=calculated capacity if all $K_2CO_3$ loaded on alumina reacted with $CO_2$, in mmol/g.

Unpromoted activated alumina, as-received (unwashed) and washed AA4 were tested using a thermogravimetric analyzer (TGA) and potassium content measured by XRF). The as-received AA4 had 4.9 weight % K, corresponding to 0.00063 moles $K_2CO_3$/g, and the washed AA4 had 3.1 weight % K, corresponding to 0.00040 moles $K_2CO_3$/g.

For each of the samples, 50 mg of adsorbent were loaded into the TGA. An initial drying step under pure $N_2$ to 100° C. was performed. While held isothermal at 30° C., 1% $CO_2$ in $N_2$ was flowed over the sample at 50 mL/min for 60 min. The sweep gas was then switched to pure $N_2$, maintained at 30° C., and flowed for another 60 min. These latter two steps were repeated 5 times, and the weight change between the beginning and end of the 1% $CO_2$ in $N_2$ step recorded as $CO_2$ uptake capacity.

The results of the TGA are shown in Table 3.

For as-received AA4 ($K_2CO_3$ promoted alumina), the utilization is shown to be about 40% in the first exposure to $CO_2$, and drops to only 4% after 5 cycles of $CO_2$ exposure and ambient regeneration in $N_2$. To contrast, it is demonstrated that after water washing the AA4 adsorbent, the first cycle utilization of $K_2CO_3$ improves to 50%, while cycle 5 utilization improves to 12%, which is 3 times that of the sample without washing. In addition, the washed sample displays a slower rate of capacity loss than the unwashed sample. The unwashed retains only 22% (0.080/0.362) of its original capacity on the 5$^{th}$ cycle, while the washed sample retains 32% (0.104/0.323) of its original capacity.

TABLE 3

|  | CO₂ capacity (mmol/g) | | K₂CO₃ Utilization (%) | |
|---|---|---|---|---|
|  | Cycle 1 | Cycle 5 | Cycle 1 | Cycle 5 |
| Unpromoted activated alumina | 0.125 | 0.054 | — | — |
| AA4 | 0.362 | 0.080 | 38 | 4 |
| Washed AA4 | 0.323 | 0.104 | 50 | 12 |

The change of the composition of each adsorbent as a result of washing each adsorbent was determined using Fourier Transform infrared (FTIR) spectroscopy.

Each of the adsorbents, both as-received and washed samples, were each individually manually ground with a mortar and pestle until the mean particle size was between 10 and 300 microns as determined using a Horiba LA-950 laser particle analyzer. The resulting powder was dried in an oven at 90° C. for 12 hours in an air atmosphere. After drying, each powder sample was pressed onto a diamond crystal in a SmartORBIT™ ATR accessory and a spectrum was obtained by co-adding 128 scans at 4 cm$^{-1}$ resolution with a Nicolet Nexus 670 FT-IR interferometer.

Figure 2:
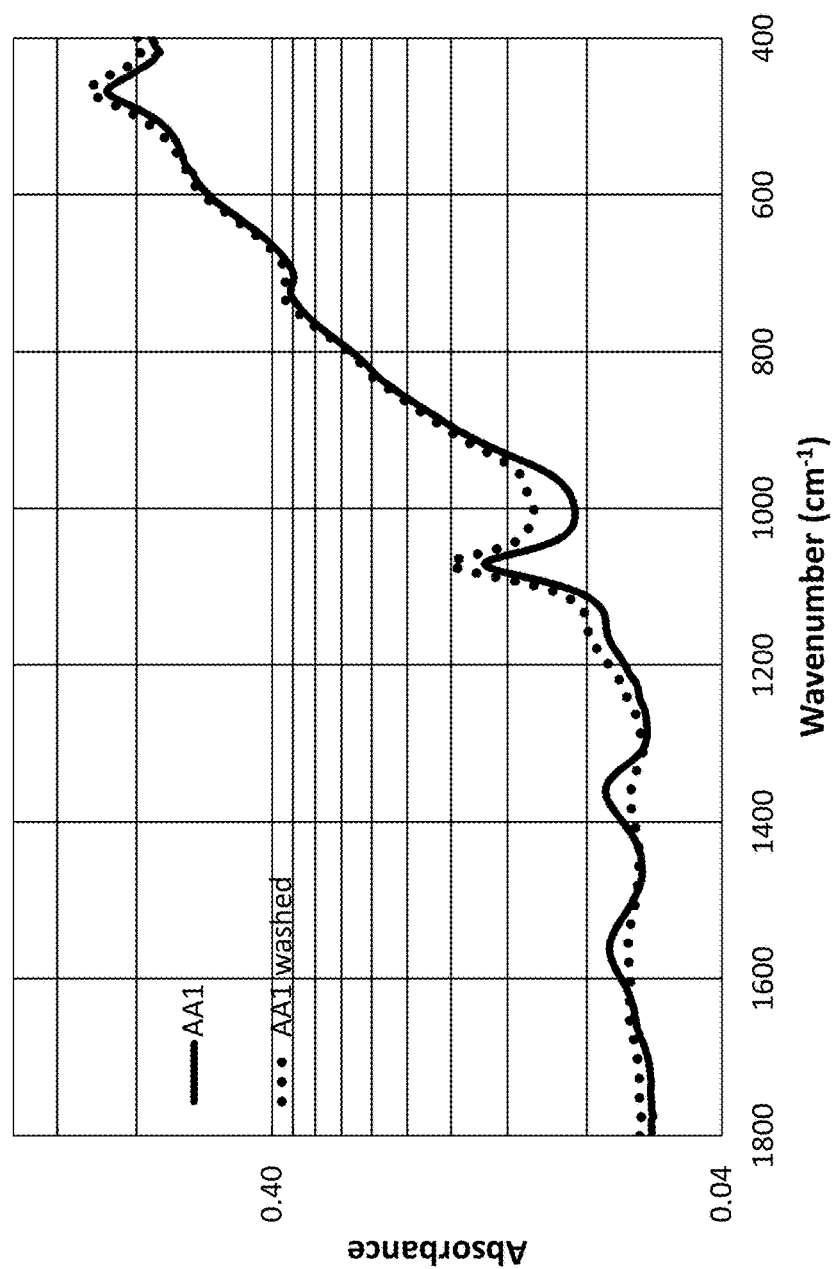
FIG. 2 is a plot of FTIR absorbance spectra for as-received (unwashed) and washed AA1 adsorbent.

An adsorbance spectrum for AA1 is shown in FIG. 2. The peak absorbance intensity for alumina is observed at an FTIR wavenumber in a range from 420 cm$^{-1}$ to 520 cm$^{-1}$, and the peak absorbance intensity for carbonate is observed at an FTIR wavenumber in a range from 1300 cm$^{-1}$ to 1400 cm$^{-1}$.

The measured carbonate and alumina peak intensities are corrected by subtracting the baseline signal intensity, measured as a linear baseline function determined from two local minimum values of absorbance intensity between frequencies ranging from 1100 cm$^{-1}$ to 1800 cm$^{-1}$. For example, the baseline function for the FTIR spectra measured for AA1, was calculated using values at wavelengths of 1292 cm$^{-1}$ and 1751 cm$^{-1}$, where the absorbance intensities (AI) were 0.0587 and 0.0574, respectively. The linear function:

$$AI = a*W + b$$

where

AI=absorbance intensity

W=wavelength in cm$^{-1}$ a=(0.0587−0.0574)/(1292−1751)=−2.83·10$^{-6}$ b=0.0587−(−2.83×10$^{-6}$)*1292=0.0624 was determined. The absorbance intensity of the baseline at the carbonate peak wavenumber of 1359 cm-1, was then calculated as:

$$AI = -2.83 \times 10-6 * 1359 + 0.0624 = 0.0585.$$

The same baseline absorbance intensity is used for the alumina peak wavenumber, due to the relative closeness in frequency of the alumina and carbonate wavenumbers, and the insignificance of baseline variation versus the larger intensity of the alumina peak.

The measured intensities, baseline intensity, and baseline subtracted corrected intensities taken from the adsorbance spectrum shown in FIG. 2 are summarized in Table 4 for AA1 and washed AA1. The baseline corrected carbonate peak intensity is the peak intensity minus the baseline intensity. For example, the baseline corrected carbonate peak intensity is 0.0724−0.0585=0.0139.

TABLE 4

| | Carbonate peak intensity | Alumina peak intensity | Baseline intensity | Baseline corrected carbonate peak intensity | Baseline corrected alumina peak intensity |
| --- | --- | --- | --- | --- | --- |
| AA1 as received | 0.0724 | 0.930 | 0.0585 | 0.0139 | 0.872 |
| AA1 washed | 0.0638 | 1.02 | 0.0604 | 0.00340 | 0.955 |

The baseline corrected absorbance intensity for the carbonate peak and the alumina peak, along with the carbonate to alumina intensity ratio, are shown in Table 5 for each of the adsorbents, as-received and washed. The carbonate to alumina intensity ratio is calculated by dividing the baseline corrected carbonate peak intensity by the baseline corrected alumina peak intensity, e.g. for the as-received AA1, the carbonate to alumina intensity ratio is 0.0139/0.872=0.0159.

TABLE 5

| | AA1 | | AA2 | |
| --- | --- | --- | --- | --- |
| | absorbance intensity (counts/sec) | | | |
| | as-received | washed | as-received | washed |
| carbonate | 0.0139 | 0.00340 | 0.0151 | 0.00970 |
| alumina | 0.872 | 0.955 | 0.700 | 0.713 |
| carbonate/alumina | 0.0159 | 0.00356 | 0.0216 | 0.0136 |
| | AA3 | | AA4 | |
| | absorbance intensity (counts/sec) | | | |
| | as-received | washed | as-received | washed |
| carbonate | 0.0267 | 0.0122 | 0.0121 | 0.00860 |
| alumina | 0.730 | 0.985 | 0.666 | 0.769 |
| carbonate/alumina | 0.0366 | 0.0124 | 0.0182 | 0.0112 |

The results in Table 5 show that that the carbonate to alumina intensity ratio is significantly reduced as a result of washing the adsorbent, which correspondingly shows that the carbonate species are significantly reduced as a result of washing the adsorbent.

As a result of washing the adsorbents the carbonate to alumina intensity ratio is reduced below 0.0150 for all of the adsorbents, a value less than any of the as-received adsorbents.

It is unexpected that washing does not remove the majority of the potassium given the high water solubility of $K_2CO_3$. For the AA1 adsorbent, potassium content only drops from 4.9 wt % to 3.1 wt % after washing (63% remains on the surface). Table 1 in U.S. Pat. No. 7,759,288 patent shows $CO_2$ capacity increases as you go from 0, 5, and 8 wt % $K_2CO_3$. The result in this disclosure, where removing carbonate from the alumina increases $CO_2$ capacity in cyclic operation is highly unexpected.

In view of the results shown in Table 2 above, it is seen that the low carbonate containing compositions allow higher utilization of the alkali, particularly for PSA cycles and low temperature TSA cycles.

In this disclosure, it is shown that by removing the unreacted alkali carbonates via water washing, the kinetics of $CO_2$ sorption/desorption is improved, cyclic $CO_2$ capacity is increased, and utilization of the $K_2CO_3$ is increased. This leads to better overall performance in PSA cyclic conditions compared to as-received promoted activated alumina as shown in Table 2.

The utility the present adsorbent provides is a new composition of alumina that provides better $CO_2$ removal performance in a PSA system, particularly for $CO_2$ removal prior to cryogenic distillation of air, and a method of manufacture where alkali carbonate or oxide promoted activated alumina can be modified, regardless of promotion method, for improved use in PSA cycles to remove $CO_2$ from a gas composition.

The washing step is shown to improve PSA performance in various promoted aluminas, including salt sprayed, co-formed, and Na or K impregnated species. IR spectroscopy confirms that alkali promoted aluminas can be modified to a unique composition after washing, where very little carbonate remains in the material.

The invention claimed is:

1. A method for making adsorbent particles for adsorbing $CO_2$, the adsorbent particles comprising alumina, one or more alkali metals, and a carbonate compound, the method comprising:

washing alkali-promoted activated alumina materials comprising a carbonate compound with water; and drying the washed alumina materials to form the adsorbent particles;

wherein the washed and dried adsorbent particles have a carbonate to alumina intensity ratio, $R_2$, which is smaller than the carbonate to alumina intensity ratio, $R_1$, of the alkali-promoted activated alumina materials before washing;

wherein the carbonate to alumina intensity ratio is as determined by Fourier Transform infrared spectroscopy of a crushed sample of the respective washed and dried adsorbent particles and a crushed sample of the alkali-promoted activated alumina materials before washing, wherein the carbonate to alumina intensity ratio is a ratio of a peak absorbance intensity for carbonate, $AI_{carbonate}$, to a peak absorbance intensity for alumina, $AI_{alumina}$, (i.e. $R=AI_{carbonate}/AI_{alumina}$)) each absorbance intensity obtained after subtracting a baseline signal intensity, where the peak absorbance intensity for alumina, $AI_{alumina}$, is observed at an FTIR wavenumber in a range from 420 cm$^{-1}$ to 520 cm$^{-1}$, and the peak absorbance intensity for carbonate, $AI_{carbonate}$, is observed at an FTIR wavenumber in a range from 1300 cm$^{-1}$ to 1400 cm$^{-1}$.

2. The method according to claim 1 wherein the water is deionized water.

3. The method according to claim 1 wherein the alkali-promoted activated alumina materials are washed sufficiently to produce adsorbent particles having a carbonate to alumina intensity ratio, $R_2$, having a value less than or equal to 0.0150.

4. The method according to claim 1 wherein the alkali-promoted activated alumina materials are washed with water until the alkali-promoted activated alumina materials have a pH in solution of 9.5 or less thereby forming washed alumina materials, the pH in solution as determined by measuring the pH of an equilibrated 2 liter solution of deionized water containing 100 g of the washed alumina materials.

5. Adsorbent particles for use in a process to remove $CO_2$ from a gas mixture containing $CO_2$ made in a method according to claim 1.

6. An adsorption unit comprising a bed containing the adsorbent particles according to claim 5.

7. A method for making adsorbent particles for adsorbing $CO_2$, the adsorbent particles comprising alumina, one or more alkali metals, and a carbonate compound, the method comprising:

washing alkali-promoted activated alumina materials comprising a carbonate compound with water; and drying the washed alumina materials to form the adsorbent particles;

wherein the alkali-promoted activated alumina materials are washed sufficiently to produce adsorbent particles having a carbonate to alumina intensity ratio, R, the carbonate to alumina intensity ratio, R, having a value less than or equal to 0.0150, where the carbonate to alumina intensity ratio is as determined by Fourier Transform infrared spectroscopy of a crushed sample of the adsorbent particles, wherein the carbonate to alumina intensity ratio is a ratio of a peak absorbance intensity for carbonate, $AI_{carbonate}$, to a peak absorbance intensity for alumina, $AI_{alumina}$, (i.e. $R=AI_{carbonate}/AI_{alumina}$), each peak absorbance intensity obtained after subtracting a baseline signal intensity, where the peak absorbance intensity for alumina, $AI_{alumina}$, is observed at an FTIR wavenumber in a range from 420 cm$^{-1}$ to 520 cm$^{-1}$, and the peak absorbance intensity for carbonate, $AI_{carbonate}$, is observed at an FTIR wavenumber in a range from 1300 cm$^{-1}$ to 1400 cm$^{-1}$.

8. Adsorbent particles for use in a process to remove $CO_2$ from a gas mixture containing $CO_2$ made in a method according to claim 7.

* * * * *